May 17, 1960  R. M. BALLARD ET AL  2,936,977
MEANS FOR ARRESTING AIRCRAFT
Filed Aug. 4, 1955  2 Sheets-Sheet 1

INVENTORS
Raymond M. Ballard
Charles J. Daniels
Donald B. Doolittle
Robert J. Haber
BY Herbert M. Birch
ATTORNEY May 17, 1960 R. M. BALLARD ET AL 2,936,977
MEANS FOR ARRESTING AIRCRAFT
Filed Aug. 4, 1955 2 Sheets-Sheet 2

INVENTORS
Raymond M. Ballard,
Charles J. Daniels,
Donald B. Doolittle,
Robert J. Haber:
BY Herbert M. Birch
ATTORNEY

United States Patent Office 2,936,977
Patented May 17, 1960

2,936,977

MEANS FOR ARRESTING AIRCRAFT

Raymond M. Ballard, Newark, and Charles J. Daniels, Donald B. Doolittle, and Robert J. Haber, Wilmington, Del., assignors to All American Engineering Company, Wilmington, Del., a corporation of Delaware Application August 4, 1955, Serial No. 526,498

8 Claims. (Cl. 244—110)

The present invention relates to aircraft arresting means and is related to prior co-pending application Serial Number 300,014, filed July 21, 1952, now U.S. Patent No. 2,731,219 of January 17, 1956, in the name of Robert B. Cotton and Donald B. Doolittle, and owned by the present assignee.

Generally the object of this invention is to provide an aircraft arresting means with a fluid loaded cylinder, said fluid being stationary therein, that is non-circulated, and drag means connected to an arresting cable or deck pendant engageable by an aircraft carried arresting hook.

Another object is to provide a fluid arresting system for aircraft comprising progressively variable resistance means in the fluid loaded cylinder, said progression developing as said means is dragged through the stationary fluid.

A further object is to provide a hydraulic arresting system having a plurality of arresting engines positioned for selective or collective operation to accommodate the varying arrest developed weight ranges of different craft.

A still further object is to provide a plurality of alternately positioned arresting units on each side of an aircraft runway having a plurality of transverse arresting cables for arresting hook engagement either individually or collectively.

Yet another object is to provide an arresting gear of few parts, thereby making the same easy to assemble, transport, durable and highly efficient in action.

Another object as in the above co-pending application is to provide an arresting engine with a reduced moving mass, as compared to other arresting engines, which will reduce the initial cable load caused by acceleration of the moving mass of the arrest means, thus providing satisfactory performance at higher airplane engaging speeds.

With the foregoing and other objects in view, the present invention consists of certain novel features of construction, combination and arrangement of parts, as will now be more fully described and particularly defined in the appended claims.

In the drawings, wherein like parts are given like reference numerals and are thus identified throughout the following description:

Fig. 3 is a transverse section through the fluid cylinder showing a second form of arresting means inside the cylinder;

Fig. 4 is a cross section view of a third form of the arresting means;

Fig. 5 is a fourth form of the arresting means.

Figure 1:
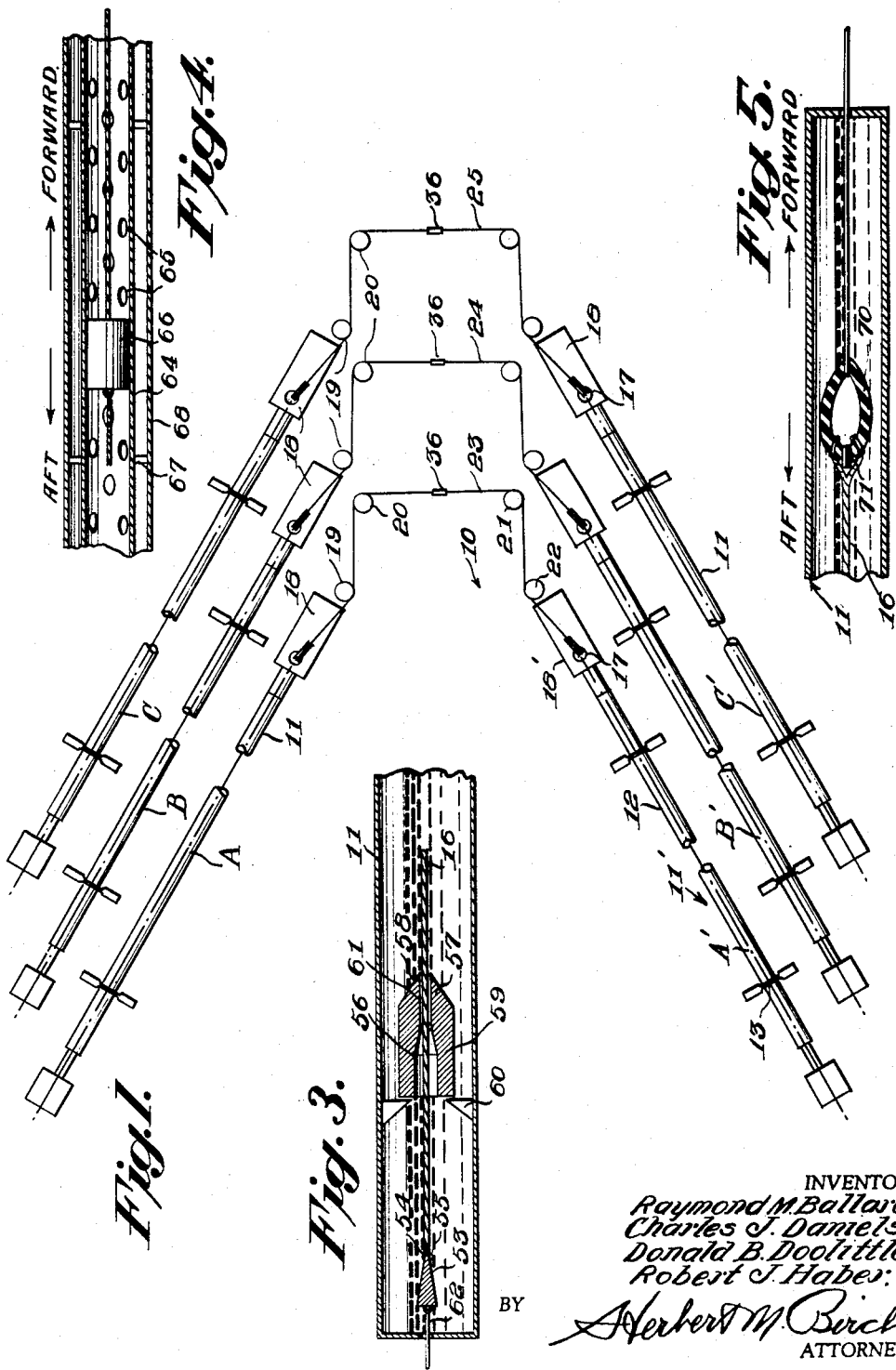
Fig. 1 is a general top plan view of a landing runway with some of the present novel spaced pairs of units mounted adjacent thereto for operation.

Referring to the drawings in detail and first with particular reference to the diagrammatic top plan view of Figure 1, there is disclosed any suitable runway 10, such as for example, a ground strip, a mat, a landing deck or the like, with opposed sets or pairs of arresting units arranged along each longitudinal side of the runway 10 in a predetermined spaced relation. In this view, there are disclosed three oppositely positioned sets of units, namely A—A', B—B' and C—C'. Each unit of each set is identical in construction and units A, B and C are arranged on the left side of the runway when facing in the direction of the arrest end thereof, while units A', B' and C' are on the right side, and accordingly a detailed description of one unit is believed sufficient.

Figure 2:
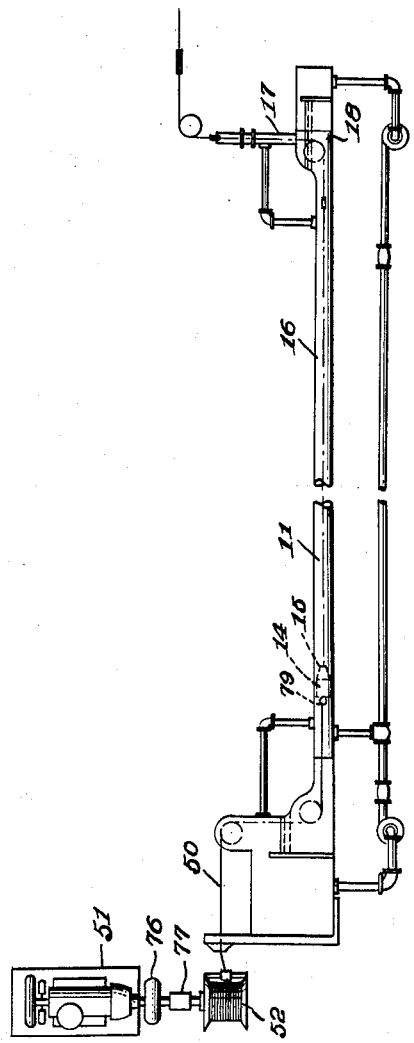
Fig. 2 is an assembled elevational view partly in cross section of one form of one of the complete arresting units shown in Fig. 1.

Each unit comprises an elongated housing 11, such as a tube or cylinder formed in flanged sections 12 bolted together through their respective adjacent flanges 13, see Figure 1. Within the housing is an arresting means, such as a piston 14 of relatively smaller outer diameter than the internal bore of the housing 11. This piston is connected at its arrest portion or nose 15 to an arrest cable 16, and the cable extends from the piston through-out the housing and through an aperture 17 in the housing end cap or sump 18, see Fig. 2.

The cable 16 leads off from the cap 18 of unit A, for example, and reeves around pulleys or sheaves 19, 20, 21 and 22, so as to extend across the runway 10 and through the cap 18' of unit A' into coupling engagement with the nose 15' of the piston 14' in the companion housing 11'. Thus the cross strand 23 of cable 16 provides an arrest pendant for engagement by the conventional arrest gear carried by a landing aircraft. When such arrest engagement occurs the pendant strand section 23 of the arrest cable 16 is pulled forward by the craft and an equalized pull is transmitted to the companion pistons 14 and 14' of the oppositely positioned companion units A and A'.

Each pendant strand, namely 23, 24 and 25 of each set of units, A—A', B—B' and C—C' is formed with a separable connection 36, whereby each strand may be parted to unharness and maintain any one of the respective units idle or to provide for harnessing two or more sets of units when desired to permit efficient arrest of greater weights. For example, A and A' alone are efficient up to 6,000 pounds, A and A' plus B and B' up to 12,000 pounds, and A and A' plus B and B' plus C and C' up to 18,000 pounds.

Another form of the arresting member is disclosed in Figure 3, wherein the respective piston structure is in compound form, that is, the cable 16 connects to the nose of a small piston element 53. The nose portion includes spring catches 54 and 55, which seat into a conical opening 56 with detents to receive the catches in a relatively larger streamlined body 57. This body has a tapered nose 58 and is normally seated against a stop 60. The body 57 has a central cable opening 61 and a trailing skirt 59. After picking up of the streamlined body 57, the piston 53 becomes in effect one large piston and thus provides a more restricted annular orifice between the outer diameter thereof and the interior wall of its respective housing 11 and greater shock resistance.

The cable opening 61 in the body or main piston 57 is enlarged at the rear end of the piston for receiving the auxiliary piston 53 and the engagement of piston 53 with piston 57 causes movement of the latter through the tube 11 in an arresting operation. The relative positions of pistons 53 and 57 is as in Fig. 3 wherein the main piston 57 engages the stop 60 under action of the retrieving cable 62 and the auxiliary piston is disposed rearwardly of the main piston. During the initial phase of an arresting operation, the tension in cable 16 is resisted by inertia and also by the fluid drag of the auxiliary piston 53. The inertia and fluid drag of the auxiliary piston, however, are relatively low. After a certain distance of travel, the auxiliary piston 53 engages the main piston 57 which engagement is gradual due to the fact that the liquid in the opening 61 in piston 57 must be forced out upon entry of the auxiliary piston 53 whereby sudden impact between the two pistons is avoided. Thus there is provided a compound piston comprising a piston element of small mass and a piston element of relatively large mass and which elements are normally individual and at the beginning of an arrest operation the small mass piston element 53 first becomes operative and thereafter the combined piston elements 53 and 57 become operative and the transition from the drag of the first piston element to the drag of the combined piston elements is gradual due to liquid displacement entry of the small mass piston element into the opening in the large mass piston element.

While in Fig. 3, the cylindrical wall of the main piston 57 is shown in exaggerated spaced relation to the inner wall of the tube or housing 11, it is to be understood that in actual practice said walls are sufficiently close that the piston 57 will remain in substantially horizontal position.

The retrieving cable 62 is connected to the tail end of piston 53 and causes release of the spring catches 54 and 55 when the skirt edge strikes the stop 60, to thereby reset the arrest engine mechanism for the next arrest operation.

A third form of the present invention is disclosed in the cut-away cross section view in Figure 4. This arrangement modifies the housing structure 11 by positioning a tube 64 with perforations 65 of gradually reduced sizes within and concentric with a tube 68. The larger perforations are at the retrieve end of the housing and the relatively smaller perforations are toward the arrest end thereof. Within the tube 64 is an arrest means, such as the piston 66 coupled to the arrest cable 16 and the retrieve cable at the opposite end as in the foregoing forms.

The perforations 65 may vary in size or frequency to provide for the most efficient results in action and the perforated tube is mounted and spaced from the interior walls of the outer tube 68 by means of spider brackets 67. The tube 64 and the confines of tube 68 are both filled with liquid, which liquid is quiescent or non-circulated as in the other form of this invention. Thus when the arrest piston 66 is pulled toward the arrest end the quiescent or stagnant liquid is displaced through the perforations in tube 65 with varying resistance and pressures until the aircraft engaged with the cable 16 is completely arrested.

A fourth form of the present invention is shown in Figure 5, and comprises the elongated liquid-filled tube 11 and a piston element 70. This piston is hollow and formed of elastic material, such as rubber, stretchable fabric or plastic and includes an air valve 71 at the retrieve end for inflation. The arrest end 72 of the piston is more pointed or tapered than the tail end and is coupled to the arrest cable 16 so as to be pulled thereby to consummate an arrest.

The piston 70 is drawn through the liquid or fluid in the tube 11 and the piston being of an elastic nature, has a particular drag loading; that is, under a load of so many thousand pounds, and under which condition the piston retains its original shape. However, if the load becomes greater, the piston elongates and allows more fluid to pass around it. When a sufficient amount of energy has been expended to allow the drag load to reduce, the piston expands to its original shape and size. This expansion and contraction takes place in direct proportion to the loading and therefore provides a constant drag load.

After an arrest has been made it is desirable to retrieve the arrest piston and return it to battery position. To accomplish this restoration the engine 51 is started and through the torque converter 76 and the friction clutch 77 a suitable driving rotation is imparted to the retrieving drum 52 shown in Figure 2. Around the retrieving drum is wound the hereinabove referred to retrieving cable 16, which connects to the retrieving side of the piston 70 by the grapnel 78.

What is claimed is:

1. Arresting means for aircraft comprising opposed sets of arresting units with elongated housings disposed at each side of a landing surface filled with liquid and having a fore end, movable means in said housings movable through said liquid, and a cable extending from said housings beyond the fore ends thereof and across a landing surface, and said cable having its ends coupled to said movable means in each respective housing, said movable means comprising a piston in each housing adapted to squeeze the liquid between its outer diameter and the inner bore of said housing when the cable is pulled by an aircraft engaged with the portion of said cable crossing said landing surface, to thereby drag said movable means toward the fore ends of the housings, and means operatively associated with said movable means for increasing the resistance thereof to the pull by the aircraft on the cable.

2. Arresting means for aircraft comprising a pair of elongated tubes filled with stagnant liquid and each having a fore end and an aft end, movable means in each of said tubes movable through said liquid by energy developed beyond the fore ends of said tubes, said movable means comprising a piston having a leading and trailing end in each of said tubes, a cable having its ends coupled to the leading ends of each of the pistons in their respective tubes, a stop means formed in the bore of each tube near the aft end thereof, a streamlined body in each tube engageable with said stop means, said body having a skirt portion with a central opening through which said cable is threaded, said piston being relatively smaller than said body and adapted to nest within said skirt portion when pulled forward through its respective tube, to thereby pick up said body from said stop means and form a compound arresting piston between said stop means and said aft end of the tube.

3. The arresting engine described in claim 2, wherein the said body within the skirt portion thereof is formed with spring receiving detents, and said piston including spring means adapted to snap into said detents, to thereby couple together with said body on movement of the piston toward the fore end, said stop serving to block said body and uncouple said piston therefrom on movement of said piston by the stop toward the aft end of the tube.

4. An aircraft arresting means mounted adjacent a runway comprising a pair of elongated tubes disposed at opposite sides of a runway, each of said tubes having a fore and an aft end, cap means over each end of each of the tubes, means for maintaining said tubes full of liquid, piston means in each of said tubes, said piston means having fore and aft ends and a first cable means coupled to each fore end of each piston means in each tube a second cable coupled to each aft end of each of said respective piston means, said first and second cables extending through the respective caps at each of the said fore and aft end of said tubes and said first cable coupled to the fore ends of said respective piston means having a portion thereof exposed across the runway beyond each of said fore ends of the said respective tubes, said fore ends of each of said piston means coupled respectively to each end of said first cable having variable resistance to pull thereof from an aft position of the said piston means through the liquid in their respective tubes by said cable to fore position thereof in the tubes, to thereby decelerate and stop a landing aircraft on the runway engaged with said exposed cable portion across the runway, and means for returning said respective piston means from a fore position in the said tubes coupled to said second cable coupled to the aft end of said respective piston means.

5. The aircraft arresting means of claim 4, wherein the said piston means are each made of engageable compound parts which nest together upon initial pull on said first cable when the said respective piston means are in an aft position in their respective tubes.

6. The aircraft arresting means of claim 4, wherein the piston is hollow and inflated, whereby the size thereof is enlarged laterally by the pressure of the liquid at the arresting end of the piston when the same is pulled forward by the said cable.

7. An energy absorber for arresting aircraft comprising a first tube having an arresting end and a retrieving end, a second perforated tube concentrically mounted in said first tube, an arresting piston in said second tube, and an arresting cable coupled to the arrest end of said piston, said cable extending from the arrest end of said first and second tubes into an arrest loop engageable by an aircraft.

8. The energy absorber described in claim 7, wherein the perforations of said second tube vary in frequency, size and spacing from the retrieving end to the arresting end of the tube, whereby a desired pressure differential is maintained as the piston velocity varies.

References Cited in the file of this patent

UNITED STATES PATENTS

| | | |
|---|---|---|
| 1,242,103 | Hunter | Oct. 2, 1917 |
| 1,315,320 | Mesurier | Sept. 9, 1919 |
| 1,320,060 | Jenny | Oct. 28, 1919 |
| 1,658,962 | Aikens | Feb. 14, 1928 |
| 1,802,254 | Holland | Apr. 21, 1931 |
| 2,151,704 | King | Mar. 28, 1939 |
| 2,473,397 | Slavin | June 14, 1949 |
| 2,474,858 | Nicholson | July 5, 1949 |
| 2,526,541 | Colley | Oct. 17, 1950 |
| 2,743,073 | Gilligan | Apr. 24, 1956 |

FOREIGN PATENTS

| | | |
|---|---|---|
| 16,632 | Great Britain | July 19, 1913 |
| 263,298 | Great Britain | Dec. 30, 1926 |
| 301,761 | Great Britain | Dec. 4, 1928 |

OTHER REFERENCES

"American Society of Naval Engineering Journal," vol. 61, No. 2, page 326.